Figure 1A:
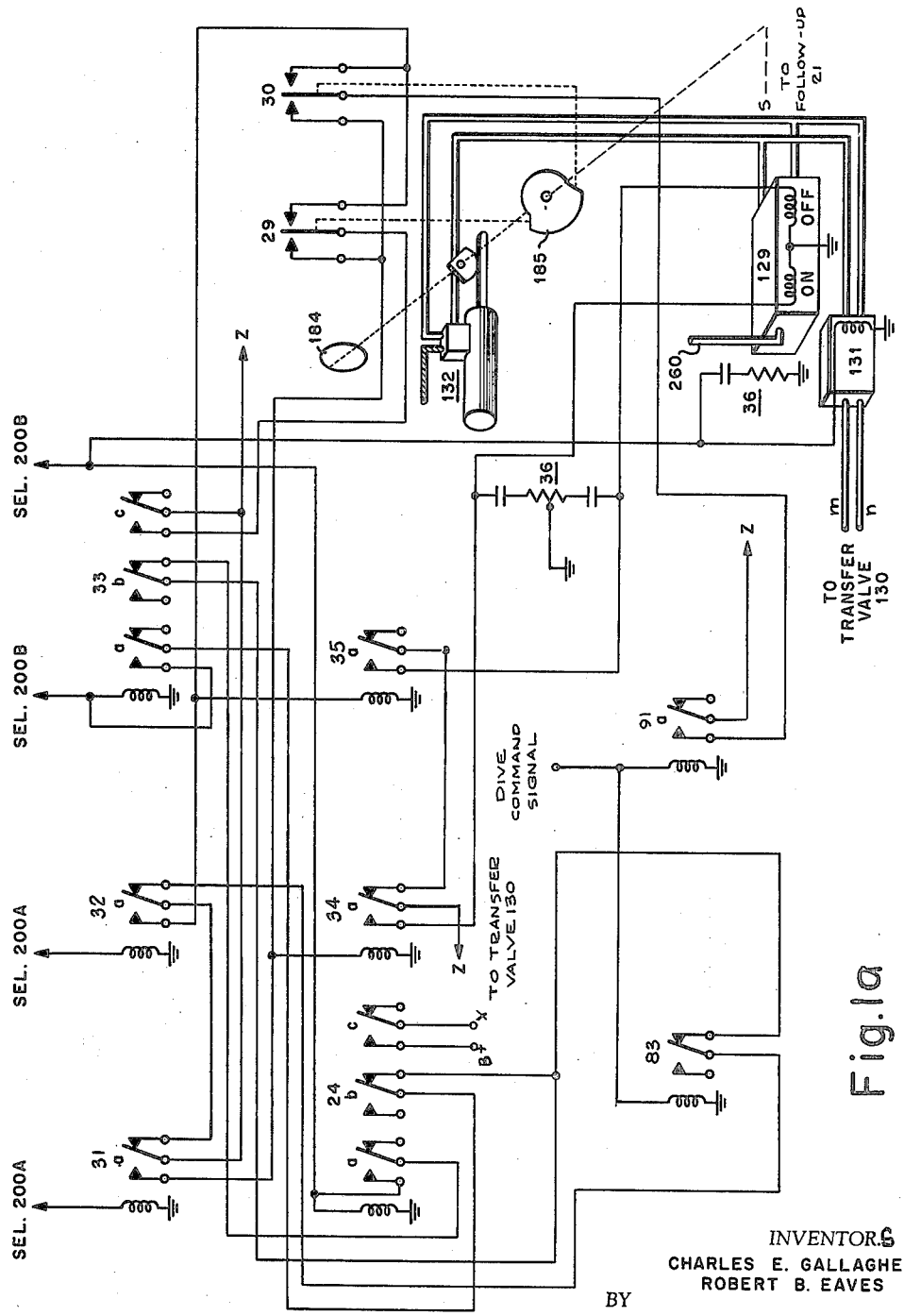

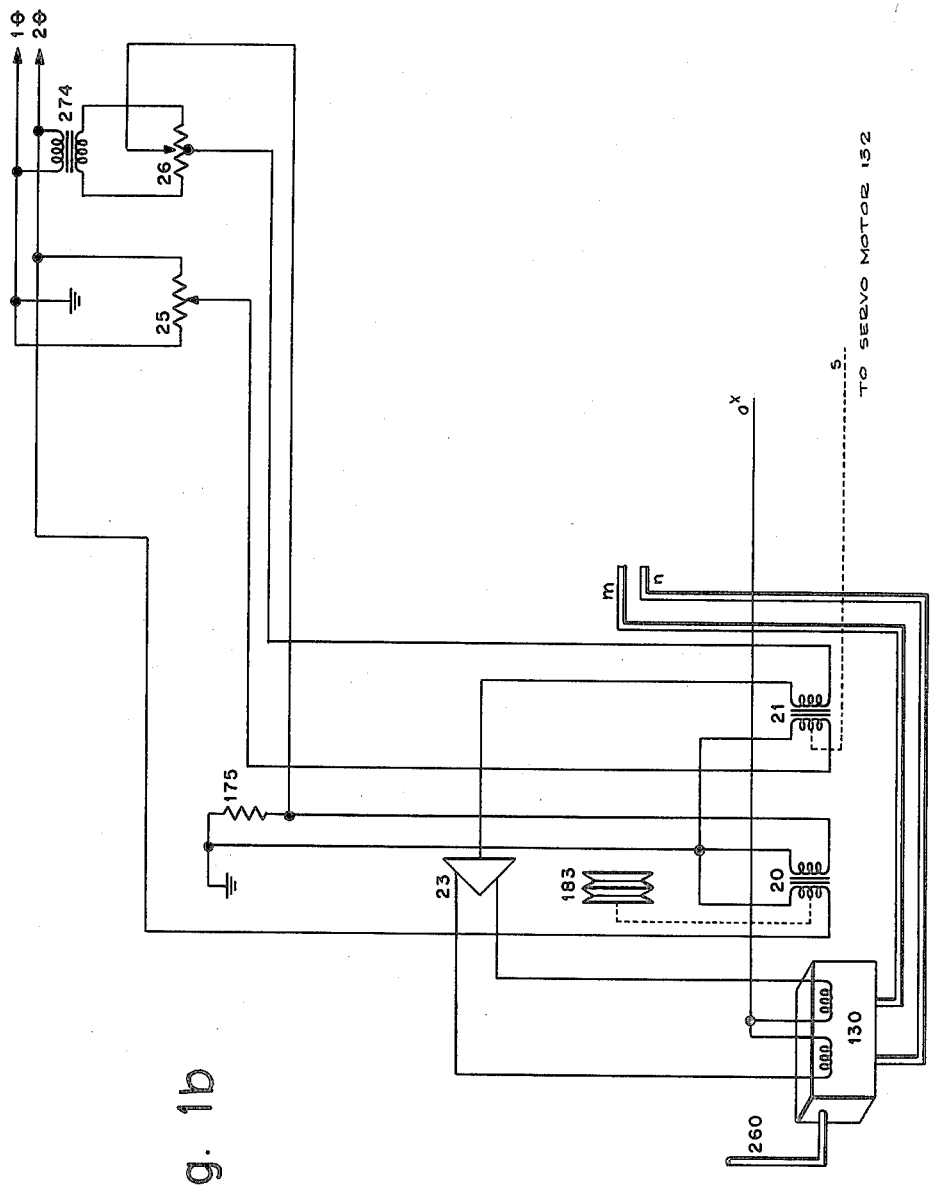

United States Patent Office 2,982,498
Patented May 2, 1961

2,982,498

AUTOMATIC THROTTLE CONTROL MECHANISM FOR AIRCRAFT

Charles E. Gallagher, Yale Hill (Box 322), Stockbridge, Mass., and Robert B. Eaves, 620 Aintree Road, Hatboro, Pa.

Original application July 24, 1953, Ser. No. 370,238. Divided and this application June 4, 1958, Ser. No. 739,952

8 Claims. (Cl. 244—77)

(Granted under Title 35, U.S. Code (1952), sec. 266)

The invention described herein may be manufactured and used by or for the Government of the United States of America for governmental purposes without the payment of any royalties thereon or therefor.

The present invention relates to a throttle control mechanism and more particularly to a throttle control mechanism for remotely controlled aircraft.

It is recognized in the art that satisfactory radio guidance of a drone aircraft is achieved in no small measure by a suitable throttle control means which is responsive to command signals to regulate aircraft engine speed in accordance with anticipated flight requirements. Various types of automatic control devices exist for controlling the speed of an engine. While the devices of the prior art are generally suitable for the purpose intended, they possess certain inherent and undesirable limitations which preclude their application to a drone aircraft. The operation of such an aircraft presents operating conditions which are unique, necessitating special throttle control means in order to provide absolute and selective control of engine speed.

Accordingly, the inventive throttle control mechanism overcomes the limitations of the prior art by providing an embodiment comprised essentially of an electro-hydraulic servo unit operable to provide selective settings of the throttle valve of an aircraft engine in response to appropriate command signals. Direct throttle Off and throttle On positions of the throttle valve as well as intermediary settings thereof are effected as a direct function of keying command time. In addition, predetermined fixed settings of the throttle valve are effected through the use of cam actuated switches upon receipt of appropriate command signals. Moreover, the inventive throttle control mechanism incorporates an airspeed throttle means embracing structure which cooperates with the servo unit to regulate the throttle valve at a setting commensurate with the maintenance of a predetermined airspeed. Thus, in the manner summarily set forth above, the instant invention presents a novel throttle control mechanism of a type particularly applicable to a remotely controlled aircraft.

This application is a division of application Serial No. 370,238, filed July 24, 1953, for Remote Control System for Aircraft.

An object of the present invention is the provision of a throttle control mechanism which is effective to perform the throttle control function normally performed by a pilot.

Another object is to provide a throttle control mechanism responsive to remote command signals to maintain absolute control of the throttle valve of an engine in a drone aircraft.

A further object is to provide a throttle control mechanism which is effective to establish predetermined fixed settings of the throttle valve of an engine in a drone aircraft according to anticipated flight requirements in response to appropriate remote command signals.

Still another object is to provide a throttle control mechanism which is effective to provide intermediary settings of the throttle control valve in a drone aircraft as the function of keying time of a remote command signal.

An additional object of the present invention is the provision of a throttle control mechanism effective to regulate the throttle valve of an engine in a drone aircraft at a setting commensurate with the maintenance of a predetermined airspeed.

The exact nature of this invention as well as other objects and advantages thereof will be readily apparent from consideration of the following specification relating to the annexed drawing in which:

Fig. 1a is a schematic diagram of a preferred embodiment of the inventive throttle control mechanism for controlling aircraft engine speed, and Fig. 1b is a schematic diagram of a preferred embodiment of the airspeed throttle control circuit of the instant invention directly connected to the mechanism shown in Fig. 1a as indicated by correspondingly lettered connections.

Referring now to the drawings, wherein like reference characters designate like or corresponding parts throughout the several views, there is shown in Fig. 1a the electrical circuits responsive upon selective keying of appropriate command signals to actuate an engine throttle valve 184. The relays numerically designated as 24, 31, 32, and 33 are connected to receive the output of either of the frequency sensitive selectors 200A or 200B, not herein illustrated, wherein the radio command signal being keyed at the ground station or in another aircraft undergoes frequency selection. It should be noted that the radio receiver and transmitter apparatus, which includes the frequency sensitive selectors 200A and 200B, is of a conventional type known in the art, and is significant in the instant invention only as the instrumentality for selectively initiating energization of the aforementioned relays. Throttle valve 184 is shown schematically by the dotted line notation to be in mechanical coupling relation with hydraulic servo 132, which also drives a cam 185 having a representative profile as indicated. Cam operated centering switches 29 and 30 establish automatic cruise and dive throttle settings, respectively, of the schematically portrayed throttle valve 184, the armatures of these switches being disposed to ride on the surface of cam 185. It should be understood that the angular displacement of cam 185 relative to throttle valve 184, as well as the representative profile configuration given cam 185 are arbitrary design factors which determine the particular throttle settings required during cruise and dive dispositions of the remotely controlled pilotless aircraft. An On-Off transfer valve 129 of a conventional solenoid type is used to control flow of high pressure oil to servo 132. A high pressure inlet 260 is a part of the high pressure line of the aircraft hydraulic system, and supplies the necessary high pressure fluid to transfer valve 129. A control valve 131 is employed in the airspeed throttle circuit, the express function of valve 131 being more concisely delineated below with respect to Fig. 1b. The RC components designated as 36 comprise an anti-spark network for the contacts disposed in parallel connection therewith.

Direct throttle control is provided by selective excitation of relays 31 and 32 in response to the throttle-on and throttle-off commands, respectively. A NO (normally open) contact of relay 31 in its activated position energizes an intermediary throttle valve-on relay 34. A NO (normally open) contact designates a relay contact which is open when the relay is deenergized and which is closed when the relay is energized. Similarly, a NC (normally closed) contact is closed when the relay is deenergized and is open when the relay is energized. The NO contact of relay 34 supplies excitation directly to the ON winding of transfer valve 129, initiating actuation of the hydraulic servo which opens throttle valve 184. The closing of the throttle valve is performed in a comparable manner by energizing relay 32 in response to the throttle-off command. A minor structural variation provides for interlocking the Z voltage through the NC contact of relay 31 before the NO contact of relay 32 can be rendered effectual in energizing the corresponding intermediary throttle valve-off relay 35. Thus, simultaneous excitation of both windings of transfer valve 129 is prevented. It should be noted that the inherent operation of the respective circuits which include the throttle-on relay 31 and throttle-off relay 32 provides displacement of throttle valve 184 as a direct function of time. Therefore, intermediate throttle settings are possible by discrete keying of the pertinent command signals for specific lengths of time.

The keying of the automatic cruise command signal is instrumental to position throttle valve 184 at a predetermined setting commensurate for cruising or landing of the pilotless aircraft, in accordance with servo loop operation as dictated by the configuration given cam 185. Specifically, the initial keying of this command effects energization of relay 33 which is then held energized by a NO holding contact 33a through which the Z voltage excitation is supplied. The voltage originates from the NC contacts of relays 31, 32, 83 and NC contact 24b to the NO contact 33a. The special interlocking as denoted insures selectivity of throttle operation. A NO contact 33c supplies excitation to the armature member of cam operated centering switch 29. It will be seen that the contacts disposed adjacent the armature of switch 29 are respectively connected to the throttle valve ON and throttle valve OFF relays 34 and 35. Therefore, excitation of either of these relays is directly provided as in direct throttle control by the continuity afforded through switch 29, so long as the armature member thereof is not neutrally centered on the cooperating sloping surface of cam 185 when automatic cruise is keyed. Servo 132 responds in characteristic manner, as previously described, until the armature member is neutrally disposed to break the circuit continuity of either of relays 34 or 35. Thus, an automatic cruise setting of throttle valve 184 is provided in the instant remote control system according to the preset disposition of the slope on cam 185.

The operation set forth above for bringing about an automatic cruise position of the throttle valve may be reiterated with respect to obtaining a predetermined dive throttle setting in connection with switch 30. In response to a dive command signal, the coils of dive relays 83 and dive transfer relay 91 are energized, and it is sufficient merely to note that the Z voltage source is applied through the NO contact of dive transfer relay 91 to the armature member of switch 30, during the execution of a vertical dive, to provide appropriate displacement of servo 132 through relay 31 or 32. Concurrently, the NC contact of the dive relay 83 interrupts the holding circuit of either the automatic cruise relay 33 or airspeed throttle relay 24, if either is in operation.

The airspeed throttle circuit shown in Fig. 1b comprises essentially an electro-hydraulic servo system which maintains the throttle valve 184 at a setting commensurate with a predetermined arbitrary flight speed which may conventiently be a speed suitable for landing. Thus with respect to Figs. 1a and 1b, the keying of the airspeed throttle command is effective to energize both airspeed throttle relay 24 and an airspeed control valve 131, the latter being normally effective in the absence of excitation to cut off the hydraulic line from transfer valve 130 shown in Fig. 1b to the hydraulic servo 132. A holding voltage, supplied to the 24a contact and series interlocked in common with the automatic cruise throttle circuit, maintains excitation for relay 24 and the solenoid of transfer valve 131. This holding voltage is shown in Fig. 1a to be supplied through the 24a contact which is now closed to the left during keying of the airspeed command signal, the closed 33b contact of the unenergized automatic cruise relay 33, the closed 83a contact of the unenergized dive relay 83, the closed 32a–b–c contacts of the unenergized throttle-Off relay 32, and the closed 31a–b–c contacts of the unenergized throttle-On relay 31 to the Z excitation voltage. Fig. 1b portrays the essential elements of the airspeed throttle electro-hydraulic servo unit. The rotor of an inductive pickoff 20 is illustrated to receive displacement from a diaphragm 183 which is sensitive to changes in airspeed. A potentiometer 26 connected to an isolation stepdown transformer 274 provides a range of adjustments, whereby a zero signal is maintained in the closed signal circuit comprising in series the stator windings of pickoff 20 and follow-up 21 including calibration potentiometer 26 when the airspeed is at a desired value. Voltages induced in the stator winding of pickoff 20 above or below the desired airspeed are impressed on to amplifier detector 23, the output of which is connected to the solenoid of transfer valve 130. A sensitivity potentiometer 25 is connected to a suitable excitation source and applies a proportionate A.C. voltage to the rotor or primary of followup 21. Hydraulic servo 132 is shown mechanically coupled to commonly drive throttle valve 184 and the rotor of followup 21. The airspeed throttle unit as portrayed in Fig. 1b is continually connected into the system save for the application of a B+ voltage to amplifier 23 through the windings of the transfer valve 130. Contact 24c thus completes the final link in the energization of the airspeed throttle unit by supplying the required B+ voltage upon receipt of an airspeed throttle command signal.

The dynamic operation of the airspeed throttle electro-hydraulic servo unit is not unlike the operation denoted in similar servo loops of the remote control system. Whenever the algebraic summation of the A.C. signal voltage appearing at the input of amplifier detector 23 is other than zero, the airspeed of the aircraft is of course at variance with the desired airspeed as calibrated with potentiometer 26, and a D.C. output is applied to the differentially operative solenoid of transfer valve 130, making servo 132 respond to thereby rotate both the rotor of followup 21 and throttle valve 184. Because of the nature of the circuit, the voltage induced in the stator of followup 21 is always opposite in polarity to the displacement signal voltage introduced into the pickoff 20 that causes servo 132 to move initially; therefore, the action tends to stop further motion of the servo. As the servo system makes correction in a throttle valve setting and the aircraft responds accordingly by effecting the change in airspeed, the original displacement signal voltage is reduced and becomes smaller than the followup voltage. The net signal voltage appearing at amplifier detector 23 is now reversed and causes return of throttle valve 184 to a new setting. Diaphragm 183 ultimately displaces the rotor of pickoff 20 an amount necessary to approach zero signal in the closed circuit. Thus, the nature of the airspeed throttle unit is to continuously make incremental corrections in throttle valve setting in order to maintain a constant desired speed of the aircraft.

Hence, in the manner set forth above, the throttle control mechanism of the instant invention performs the throttle control function that would be normally performed by a pilot. Not only is absolute control of the throttle valve effected by providing for direct throttle Off and throttle On positions, but also, intermediary settings of the throttle valve may be obtained directly with the length of keying command time. Arbitrary fixed settings of the throttle valve are respectively effected in response to automatic cruise and dive command signals. Also, recognizing that a desirable characteristic in the flight of the drone aircraft is a constant airspeed, the instant invention provides appropriate structure for regulating the throttle valve at a setting commensurate with the maintenance of a predetermined airspeed.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. Apparatus for controlling the operation of an engine in a pilotless aircraft in flight, comprising: a throttle valve, a servo system for positioning said throttle valve, first means operably connected to said servo system for positioning said valve as a function of airspeed, second means operably connected to said servo system for commanding direct throttle control irrespective of other commands, third means operably connected to said servo system for obtaining a CRUISE throttle position irrespective of prior throttle position commands, fourth means operably connected to said servo system for obtaining a DIVE throttle position irrespective of prior throttle position commands, and fifth means interlocking said first, second, third and fourth means, whereby simultaneous command is prevented.

2. Apparatus for controlling the operation of an engine in a pilotless aircraft in flight, comprising: a throttle valve actuated by a fluid motor, a first valve responsive to airspeed for controlling a fluid under pressure in said motor, a second valve for controlling said fluid in said motor, first means for actuating said second valve and for directly positioning said throttle valve irrespective of said airspeed, second means for actuating said second valve and for obtaining a CRUISE position for said throttle valve irrespective of said airspeed, third means for actuating said second valve irrespective of said airspeed, and fifth means for interlocking said first, second and third means whereby simultaneous command is prevented.

3. Apparatus for controlling the operation of an engine in a pilotless aircraft in flight, comprising: a throttle valve, a fluid servo motor operably connected to said throttle valve, a first servo valve means operably connected to said servo motor, means responsive to airspeed operably connected to said first servo valve, a second servo valve means operably connected to said servo motor, a source of fluid under pressure connected to said first and second servo valves, first and second solenoid means oppositely connected to said second servo valve for respectively providing ON and OFF positions, a throttle valve-on relay having a normally open contact and a normally closed contact, means connecting said first solenoid through said throttle valve-on normally open contact to an electrical supply, a throttle valve-off relay having a normally open contact, means connecting said second solenoid through said throttle valve-off normally open contact and said throttle valve-on normally closed contact to said electrical supply, a throttle-on relay having a normally open contact and a normally closed contact, means connecting said electrical supply through said throttle-on normally open contact to said throttle valve-on relay, a throttle-off relay having a normally open contact, and means connecting said throttle valve-off relay through said throttle-off normally open contact and said throttle-on normally closed contact to said electrical supply, said throttle-on relay and said throttle-off relay respectively adapted to be selectively energized by first and second remote means.

4. Apparatus as set forth in claim 3 further comprising: a cruise centering switch and a dive centering switch each having a movable contact selectively connected to said throttle valve-on relay or said throttle valve-off relay, cam means connected to said servo motor for positioning said movable contacts as a function of said servo motor position, means connecting said dive centering switch movable contact through a normally open contact in a dive relay to said electrical supply, means connecting said electrical supply from said throttle-on normally closed contact through a normally closed contact of said throttle-off relay and a normally closed contact of a dive transfer relay to one side of a normally closed contact of an airspeed throttle relay, auto-cruise relay having a normally closed contact and two normally open contacts, means connecting said auto-cruise relay through one of said auto-cruise relay normally open contacts to one other side of said airspeed throttle relay normally closed contact, means connecting said one side of said airspeed throttle relay normally closed contact through said autocruise relay normally closed contact and said airspeed throttle normally open contact to said airspeed throttle relay, and means connecting said electrical supply through the other of said auto-cruise relay normally open contacts to said cruise centering switch movable contact, an airspeed control valve connected between said servo motor and said first servo valve, means connecting an electrical actuating means for said airspeed control valve to said airspeed throttle relay, said airspeed throttle relay and said auto-cruise relay respectively adapted to be selectively energized by third and fourth remote means.

5. In a control system for a pilotless aircraft in flight, a throttle mechanism adapted to receive a plurality of discrete operational command signals selectively transmitted from a remote station, comprising: an airspeed throttle relay adapted to be energized by a first signal of the command signals; a dive relay and an auto-cruise relay adapted to be energized respectively by a second signal and a third signal of the command signals; a first and a second contact in said airspeed throttle relay; a throttle means operatively connected to an airspeed responsive means; and means for applying a voltage through said first contact to said responsive means for controlling the position of said throttle means; a throttle-on relay and a throttle-off relay adapted to be energized respectively by a fourth signal, and a fifth signal of the command signals; circuit means operatively interlocking said dive relay, said auto-cruise relay, said second contact, said throttle-on relay and said throttle-off relay; whereby transmitting any of the command signals renders said responsive means ineffective.

6. In a control system for a pilotless aircraft in flight, a throttle mechanism adapted to receive a plurality of discrete operational command signals selectively transmitted from a remote station, comprising: a throttle-on relay adapted to be energized by a first signal of the command signals and having a normally open contact and a normally closed contact; a throttle valve-on relay having a normally open contact and a normally closed contact; a solenoid actuated servo valve having an ON side and an OFF side; means for connecting said throttle valve-on relay through said throttle-on normally open contact to an electrical supply; means for connecting said servo valve ON side through said throttle valve-on normally open contact to said electrical supply; a throttle valve-off relay having a normally open contact; means series-connecting said throttle valve-on normally closed contact and said throttle valve-off relay between said servo valve OFF side and said electrical supply; a throttle off relay adapted to be energized by a second signal of the command signals and having a normally open contact means series-connecting said throttle on normally closed contact and said throttle off normally open contact between said electrical supply and said throttle valve-off relay; whereby simultaneous OFF and ON operation of said servo valve is prevented.

7. Apparatus as set forth in claim 6 further comprising: a normally closed contact in said throttle off relay; a dive relay adapted to be energized by a third signal of the command signals and having a normally closed contact an airspeed throttle relay adapted to be energized by a fourth signal of the command signals and having a normally closed contact; an auto-cruise relay adapted to be energized by a fifth signal of the command signals and having a normally open contact; means series-connecting said throttle on normally closed contact, said throttle off normally closed contact, said dive normally closed contact, said airspeed throttle normally closed contact and said auto-cruise normally open contact between said electrical supply and said auto-cruise relay whereby a locking-in circuit obtains; a servo motor position-responsive to said servo valve; a first cam positioned by said servo motor; a first centering switch having a movable contact actuated by said first cam and connected to said electrical supply through another normally open contact of said auto-cruise relay, and two stationary mating contacts respectively connected to said throttle valve-on relay and said throttle valve-off relay; whereby said servo motor can be scheduled at a prescribed setting for a take-off and climb maneuver.

8. Apparatus as set forth in claim 7 further comprising: a second cam positioned by said servo motor; a second centering switch having a movable contact actuated by said second cam and two stationary mating contacts respectively connected to said throttle valve-on relay and said throttle valve-off relay; a dive transfer relay adapted to be remotely energized by the third signal of the command signals simultaneously with said dive relay and having a normally open contact; means connecting said second centering switch movable contact through said dive transfer normally open contact to said electrical supply; whereby said servo motor can be scheduled at a prescribed setting for a dive maneuver.

References Cited in the file of this patent

UNITED STATES PATENTS

| | | |
|---|---|---|
| 2,664,254 | Hendrickson | Dec. 29, 1953 |
| 2,670,157 | Peterson | Feb. 23, 1954 |
| 2,769,601 | Hagopian et al. | Nov. 6, 1956 |